(12) United States Patent
Dill

(10) Patent No.: US 8,322,733 B2
(45) Date of Patent: Dec. 4, 2012

(54) DEVICE AND METHOD FOR STORING AND TRANSPORTING SUBSTANTIALLY PLANAR ARTICLES

(75) Inventor: Larry Dill, Sedalia, OH (US)

(73) Assignee: Pack-All, LLC, Jeffersonville, OH (US)

( * ) Notice: Subject to any disclaimer, the term of this patent is extended or adjusted under 35 U.S.C. 154(b) by 263 days.

(21) Appl. No.: 12/841,996

(22) Filed: Jul. 22, 2010

(65) Prior Publication Data
US 2011/0169237 A1    Jul. 14, 2011

Related U.S. Application Data

(60) Provisional application No. 61/227,502, filed on Jul. 22, 2009.

(51) Int. Cl.
*B62B 3/10* (2006.01)
(52) U.S. Cl. ............... 280/79.3; 280/47.34; 206/449
(58) Field of Classification Search ........... 280/47.34, 280/79.11, 79.3, 79.6; 206/449, 454; 211/41.1, 211/42, 71.01, 72, 184
See application file for complete search history.

(56) References Cited

U.S. PATENT DOCUMENTS

| | | |
|---|---|---|
| 2,625,973 A | 1/1953 | Weldon et al. |
| 3,164,430 A | 1/1965 | Beem et al. |
| 3,653,707 A | 4/1972 | Pile et al. |
| 3,655,088 A | 4/1972 | Box |
| 4,156,498 A | 5/1979 | Miller |
| 4,478,331 A | 10/1984 | Ruin |
| 4,499,997 A * | 2/1985 | Swingley, Jr. .......... 206/509 |
| 4,720,048 A * | 1/1988 | Maroney et al. ......... 280/47.34 |
| 4,779,752 A | 10/1988 | Vallee et al. |
| 4,889,232 A | 12/1989 | Asleson |
| 5,259,523 A | 11/1993 | Scherb |
| 5,269,422 A | 12/1993 | Chevrette |
| 5,299,688 A | 4/1994 | Mckay et al. |
| 5,390,815 A * | 2/1995 | Spiegel ................. 220/529 |
| 5,560,507 A | 10/1996 | Arpin et al. |
| 5,678,693 A | 10/1997 | Tapp et al. |
| D391,762 S * | 3/1998 | Ahern, Jr. ............... D3/302 |
| 5,765,868 A | 6/1998 | Ventrone et al. |
| 5,803,258 A | 9/1998 | Gonzalez-Rivera |
| 6,102,206 A | 8/2000 | Pride |
| 6,145,663 A | 11/2000 | Kim et al. |
| 6,264,216 B1 | 7/2001 | Wilson |
| 6,431,580 B1 | 8/2002 | Kady |

(Continued)

FOREIGN PATENT DOCUMENTS
GB    2435405    8/2007

*Primary Examiner* — John Walters
(74) *Attorney, Agent, or Firm* — Standley Law Group LLP

(57) ABSTRACT

A device for transporting various articles has a container with a bottom portion and two opposing sidewall portions extending vertically from the bottom portion. A plurality of locating features may be placed within the container, upon a pair of opposing sidewalls. Securing sheets are adapted to fit within the locating features to accommodate a number of different articles. The securing sheets may be flexible so that they can expand to accommodate an article and to provide a compressive-type securing force to keep the article in place once inserted. Some embodiments contain securing sheets which have less vertical height than the sidewall portions of the container so that articles attached to a pedestal can be securely held within the device. A means for rolling the device may be attached to the bottom portion.

19 Claims, 3 Drawing Sheets

U.S. PATENT DOCUMENTS

| | | |
|---|---|---|
| 6,558,063 B2 | 5/2003 | Ho |
| 6,672,439 B2 | 1/2004 | Platte, III |
| 6,910,582 B2 * | 6/2005 | Lantz ............................ 206/593 |
| 6,983,946 B2 | 1/2006 | Sullivan et al. |
| 6,997,310 B1 | 2/2006 | Fenley |
| 7,108,141 B2 | 9/2006 | Gonzalez-Rivera |
| 7,140,508 B2 | 11/2006 | Kuhn et al. |
| 7,147,243 B2 | 12/2006 | Kady |
| 7,284,763 B1 | 10/2007 | King |
| 7,325,891 B1 | 2/2008 | Kinsley et al. |
| 7,540,381 B2 | 6/2009 | Blasco |
| 7,578,390 B2 | 8/2009 | Ting |
| 7,604,120 B2 | 10/2009 | Ting et al. |
| 7,743,938 B2 | 6/2010 | Wu |
| 7,748,559 B2 * | 7/2010 | Bradford ....................... 220/507 |
| 7,883,001 B2 | 2/2011 | Goodrich |
| 2003/0141213 A1 | 7/2003 | Batholomew et al. |
| 2004/0227315 A1 | 11/2004 | Van Landingham, Jr. |
| 2006/0186008 A1 | 8/2006 | Fredrich et al. |
| 2008/0190790 A1 | 8/2008 | Chandaria |
| 2009/0189362 A1 | 7/2009 | Dewitt |
| 2009/0283989 A1 | 11/2009 | Abecassis |
| 2010/0108452 A1 | 5/2010 | Williams et al. |

* cited by examiner

DEVICE AND METHOD FOR STORING AND TRANSPORTING SUBSTANTIALLY PLANAR ARTICLES

CROSS-REFERENCE TO RELATED APPLICATIONS

The present application claims priority to U.S. Application No. 61/227,502 filed on Jul. 22, 2009 and herein incorporated by reference in its entirety.

BACKGROUND OF THE INVENTIVE FIELD

The storage and/or transportation of substantially planar articles can pose a number of problems. As an example, and not by way of limitation, planar articles might include: paintings, pictures and picture frames, certificates, posters, glass panels, mirrors, plates, and flat panel electronic displays. Due to their shape, fragile nature, and value to the owner, the packaging and transportation of these articles can be an expensive and time-consuming process.

Traditionally, these types of articles are packed and moved individually. In a typical operation, it takes four pieces of cardboard and one sheet of 4'×6' padded paper to pack one substantially planar article. These components are sometimes collectively referred to as a 'mirror carton.' These components typically come in different sizes, and the appropriate sized components must be purchased for each unique planar article. Not only does it take a substantial amount of time to pack each article, but the components which are used to pack the article and protect it from damage during shipping are typically discarded after one use. The labor costs for individually packing/moving each article are high along with the environmental costs of discarding all of the packing material after each move. While some re-useable containers have been developed, they typically require spacers or jigs which must be sized for the specific items to be transported.

Further, when storing these items for later use they are also typically individually wrapped and placed in storage. Careful consideration may be given to the humidity and propensity for flooding of any potential storage site. For example, when paintings or photographs are placed in a basement, it may be desirable to ensure that these items are not exposed to a high humidity environment. Also, if the basement (or other storage site) were to flood, it may be desirable to ensure that the paintings and photographs remained dry and undamaged.

During a moving process it may also be desirable to keep the planar articles dry. With a traditional moving process and the use of 'mirror cartons' the planar articles may be susceptible to water absorption. Thus, the packaged articles cannot not be taken outside when it's raining/snowing and should only be transported inside a covered truck during the move.

Also during a moving process it is desirable to use the space within a moving van/truck as efficiently as possible. While it is desirable to stack elements atop one another, prior methods and devices for moving delicate articles do not permit stacking as it could damage the articles.

SUMMARY OF THE GENERAL INVENTIVE CONCEPT

The exemplary embodiments herein provide a device and method for accepting one or more various-sized articles for quick and secure transportation and/or storage. A container is used which can quickly adjust to provide a plurality of various-sized compartments for the quick and easy storage of a plurality of various-sized articles. The interior surfaces of the container and the compartments may contain a compressible and/or non-abrasive surface to prevent damage to the articles during insertion and/or moving.

The container may include a lid which prevents contaminates from entering the compartments and damaging the articles. The lid and the container may provide a water-tight seal so that water (water-vapor, rainfall, flooding, etc.) cannot damage the articles. Casters or other rolling means may be used so that the container can quickly and easily be moved from one location to another.

Exemplary embodiments may utilize flexible securing sheets which can be used to provide a securing force on the article to keep it safe during moving. Thus, as the article is inserted the flexible sheets may separate in order to provide a compressive force on the article to hold this in place and also to be able to adapt to a variety of different shapes/sizes of articles. Further, planar articles attached to a pedestal can be securely held within the same device by simply inserting the securing sheet only to the top portion of the pedestal. This allows the planar article itself to be securely held without regard to the specific size/shape of the pedestal.

The time required to pack and move the planar articles may be substantially reduced. Further, the disposable packaging components are no longer necessary, thus reducing the amount of waste that is creating from the moving/storing process as well as the costs of the packaging materials. The articles can be moved during rainfall/snowfall without risk of damage to the articles. The articles can also be stored in damp or water-prone areas without risk of damage to the articles. The articles can also be moved in an open truck without risk of damage to the articles. Other items may be stacked on top of the container in order to maximize the storage or moving space.

Also, one exemplary device may accommodate a number of different-sized planar or semi-planar articles, thus removing the need to order and store specific packaging materials which correspond to the specific dimensions of the article.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
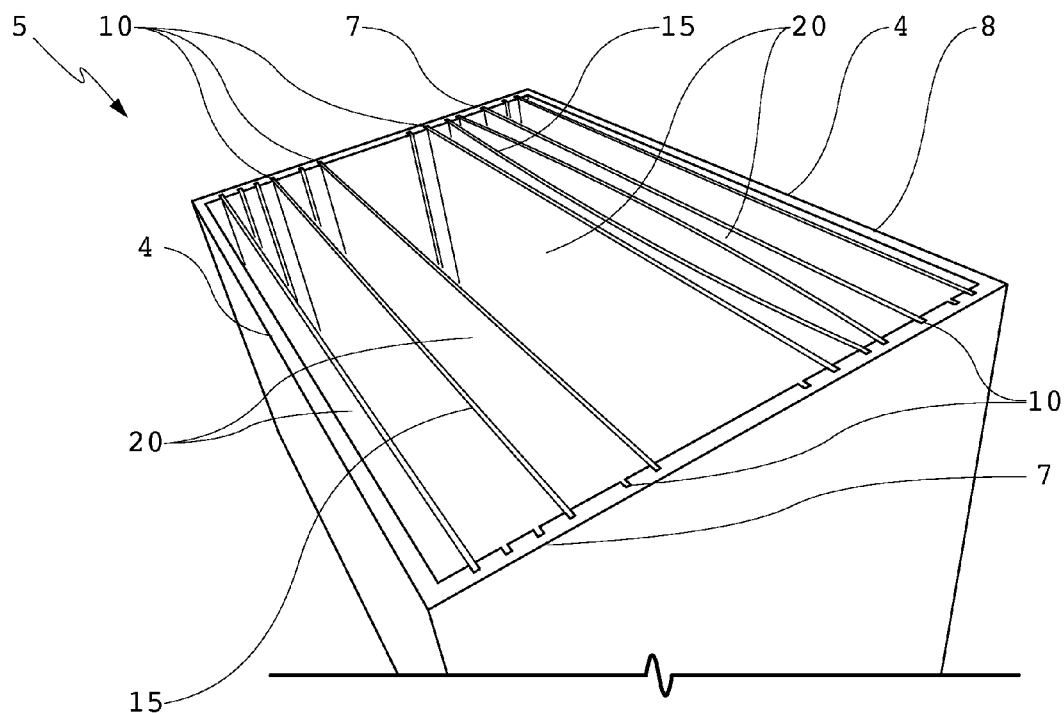
FIG. 1 provides a perspective view of an exemplary embodiment.

FIG. 1 shows an exemplary device 5 which includes a container 8 having opposing sides 7 and 4. The container may be rectangular, where the opposing sides 7 comprise the shorter sides while the opposing sides 4 comprise the longer sides. However, these could be reversed or the container 8 could have a square shape. A plurality of locating features 10 may be located on the interior surface of at least one of the opposing sides. In this embodiment, the locating features are located along the opposing sides 7 of the device 5. The locating features 10 may be slots or notches or cutouts where material has been removed from the side portion of the container. The locating features 10 may also be ribs or strips which are attached to the side portion of the container. Any type of slot or notch or groove can be used as an acceptable locating feature 10, the only requirement being that they are adapted to accept the securing sheets 15. The locating features 10 may be separated by enough space to allow the desired number of configurations of the securing sheets 15. Satisfactory results have been observed when the locating features are placed between 0.25 and 2.5 inches apart, although larger spacing may be beneficial for larger articles. The securing sheets 15 preferably mechanically engage with the locating features 10 so that a plurality of various-sized compartments 20 may be quickly and easily created.

In some embodiments, the securing sheets 15 may vertically slide into the locating features 10 from above. As will be discussed further below, the securing sheets 15 may slide all the way to the bottom portion of the container 8 or may rest upon a portion of an article. Some embodiments may allow the securing sheets 15 to be easily removed/replaced so that different sized compartments can be created by the user. Other embodiments may permanently install the securing sheets 15 at a pre-determined spacing for different purposes (or sizes of articles). Depending on the amount of flexibility of the securing sheets 15, even if they are permanently installed they could still adequately accept a wide range of differently-sized articles.

It should be noted, that although the shorter opposing sides 7 are shown having the locating features 10, other embodiments may place the locating features 10 on the longer opposing sides 4 instead. Either setup may be used, depending on the geometry of the articles being inserted. In some embodiments, the opposing sides 7 and 4 may have similar dimensions such that the container is square rather than rectangular. Again, this can be adjusted depending on the size and type of planar articles being inserted. Thus, when used to move a large number of articles, several different devices can be used (either with locating features 10 on the shorter or longer opposing sides) to accommodate the shorter or longer articles that require transporting.

Figure 2:
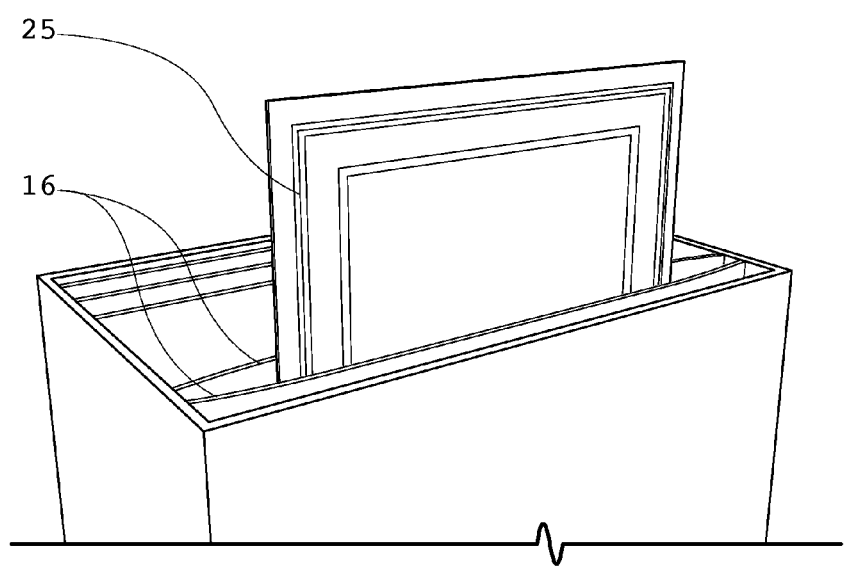
FIG. 2 provides a perspective view of an embodiment where an article is being inserted.

FIG. 2 provides a perspective view of the embodiment 5 where an article 25 is being inserted in between a pair of securing sheets 16. In this embodiment, the securing sheets 16 are flexible and/or made of a flexible material. Here, the distance between the securing sheets 16 (once inserted into the locating features) is less than the width of the article 25. Thus, in this embodiment as the article 25 is inserted into the compartment created by the securing sheets 16, the securing sheets 16 are able to flex and/or expand to accept the article 25. Once the article 25 has been inserted, the securing sheets 16 may provide a securing force on the opposing sides of the article 25 to hold the article 25 in place. This securing force may be preferable as it may limit the movement of the article during transport. In other words, the opposing securing sheets 16 can create a compression force on the article 25.

Figure 3:
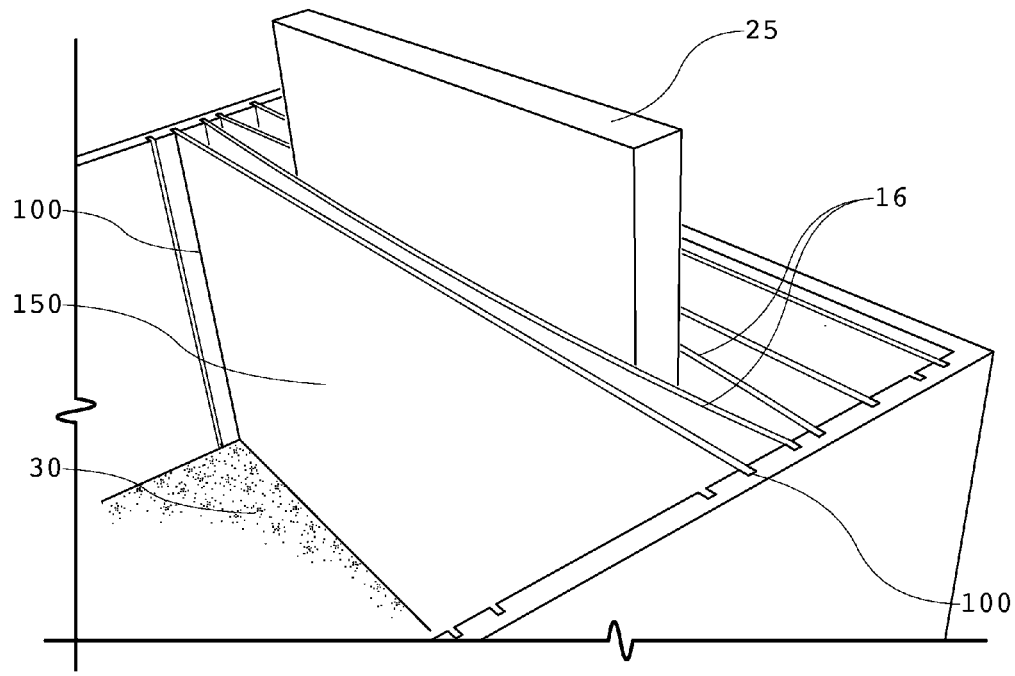
FIG. 3 provides a perspective view of an embodiment where flexible securing sheets are shown surrounding the article.

FIG. 3 provides another view where the securing sheets 16 can be seen surrounding the opposing sides of the article 25. When flexibility is desired each flexible securing sheet 16 can be thought of as having a pair of vertical edges 100 with a middle portion 150 in between the vertical edges 100. While the vertical edges 100 are preferably fixed horizontally within the locating features 10, the middle portion 150 of a flexible securing sheet 16 is preferably capable of varying degrees of horizontal movement (depending on the material chosen for the securing sheet 16, the relative dimensions of the securing sheet 16 and the locating feature 10, and the size/type of article to be transported).

In an exemplary embodiment, the interior surface on the bottom portion 30 of the container would be relatively flat, smooth, and/or continuous so that there is room for the securing sheets 16 to flex and/or expand without having their movement limited by any ribs or features on the bottom portion 30. Further, it may be preferable to provide a slip-resistance surface on the interior surface of the bottom portion 30 to prevent articles which contact the bottom portion 30 from sliding or slipping. This may be especially preferable when using rigid securing sheets 16 but can also be beneficial when using flexible securing sheets 16. Many types of slip-resistant coatings, substrates, sheets, or strips could be used with the various embodiments herein. In some embodiments, an elastomeric or rubber-type material may be used to provide a slip-resistant surface. However, other embodiments may use a roughened texture, carpet, or cloth-type of slip-resistant surface. As discussed further below, some types of slip-resistant surfaces can be used to allow multiple articles to be inserted into the same compartment 20 while the slip-resistant surface keeps the articles from sliding and heavily impacting one another during transport.

Some exemplary embodiments may also provide a layer of padding or compressible material on the bottom portion 30. This optional layer of padding or compressible material can further reduce the shock or stress on the article when being inserted or during transport.

It should be specifically noted that the securing sheets 16 can also be rigid. In an exemplary embodiment, both types (rigid and flexible) of securing sheets 16 can be used within the same container, depending on the types of articles being transported.

The surfaces of the securing sheets 15 or 16 (preferably at least the middle portions 150 of the securing sheets), the interior surfaces of the opposing sides 10, and the bottom portion 30 of the container may contain a soft (or non-abrasive) and/or compressible material to prevent any scratches, abrasions, shock, or other damage to the inserted articles. In some embodiments, any surfaces which may contact an inserted article would preferably have a non-abrasive surface. These types of surfaces can vary widely and would include but are not limited to: cloth, carpet, fabric, and plastics.

Figure 4:
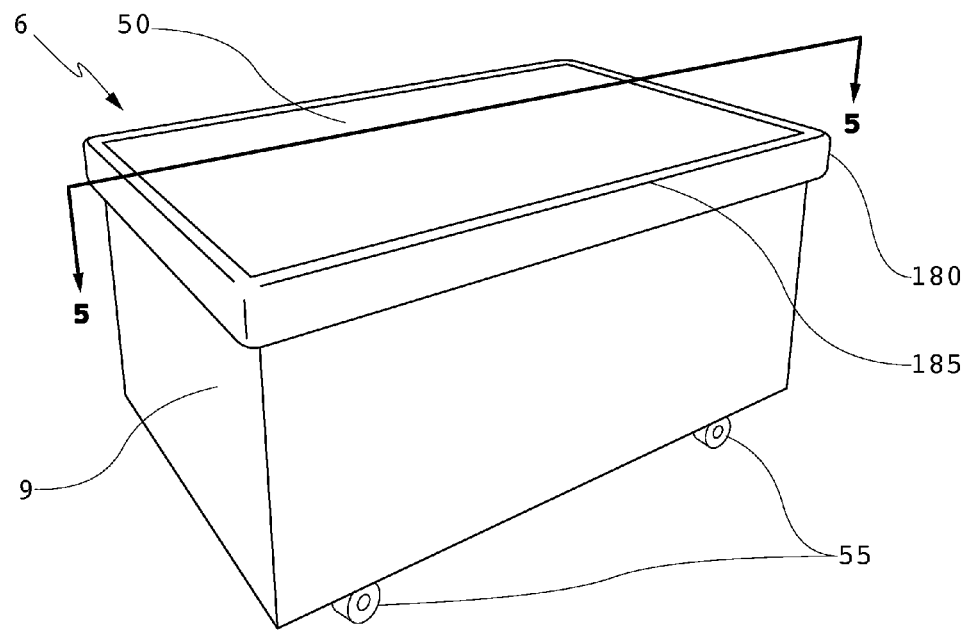
FIG. 4 provides a perspective view of an embodiment containing a lid along with optional rolling means.

Another exemplary embodiment of the device 6 is shown in FIG. 4. Here, an optional lid 50 is used to prevent contaminates (dust, dirt, water, etc.) from entering the container 9. If the lid 50 is rigid and of adequate strength it may also support the ability to stack additional items on the lid 50 once the device 6 is loaded into a vehicle or moving truck. A number of different types of lids 50 may be used. Some lids 50 may simply prevent a substantial amount of dust/dirt from entering the container but may not provide a water-tight seal. Other lids 50 may provide a water-tight seal so that humidity cannot affect the planar articles inside. A gasket may be used between the container 9 and the lid 50 to provide the optional water-tight seal. An exemplary lid 50 may be at least semi-rigid which may allow other containers (or articles for storage/transport) to be stored on top of the container 9, thus maximizing the available area in any storage space, basement, attic, and/or moving truck.

This exemplary embodiment 6 also contains a rolling means 55 to allow the container 9 to be quickly moved without requiring lifting. This can increase moving speed and efficiency along with preventing any injuries to moving personnel due to heavy lifting. The optional rolling means 55 may also allow the device 6 to be place in front of other storage/moving items. In this way, the device 6 can be easily rolled out of the way so that items behind the device 6 may be quickly accessed. Many types of rolling means 55 could be used with the embodiments herein, including but not limited to: wheels, casters, bearings, or carts. An exemplary embodiment may provide locking casters as the rolling means 55 so that the device 6 can be fixed in place once loaded onto a moving truck or while waiting to be re-located. Some embodiments may not provide a rolling means which is attached to the container. Some embodiments may allow the container to be placed upon a cart which is used to transport the container (and could be used to transport several different containers).

It may also be preferable to round the corners 180 and top edges 185 of the lid 50 to prevent the lid 50 from catching on or damaging doorways or furniture covers/blankets often used when transporting articles. An exemplary lid 50 may include a bumper around the top edge 185 (or perimeter) and corners 180 of the lid 50 to prevent damage to doorways, walls, and other items when using the device. The bumper could be a number of soft plastics or could be any substrate covered with any of the non-abrasive materials described above. FIG. 4 also shows the vertical cutting line 5-5 which provides the basis for the sectional views in FIGS. 5A-5C.

Figure 5A:
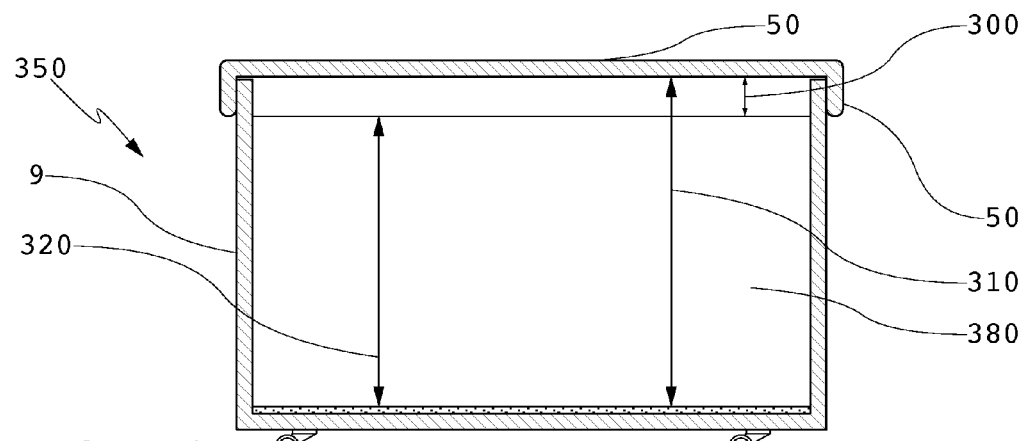
FIG. 5A provides a sectional view for another embodiment 350, produced by the cutting line 5-5 in FIG. 4.

FIG. 5A provides a sectional view for another embodiment 350, produced by the cutting line 5-5 in FIG. 4. In this embodiment 350, once the securing sheet 380 has been fully inserted into the locating features, there is a gap 300 between the top edge of the securing sheet 380 and the bottom of the lid 50. In other words, for this embodiment the vertical height 320 of the securing sheet 380 is less than the vertical height of the sidewall portions 310. This feature can be used for a number of beneficial uses, at least but not limited to the ability to accept articles which are attached to a pedestal-type base portion. These types of articles are commonly seen with flat screen displays such as LCD, plasma, and OLED displays but can be found with artwork, picture frames, and other items as well.

Figure 5B:
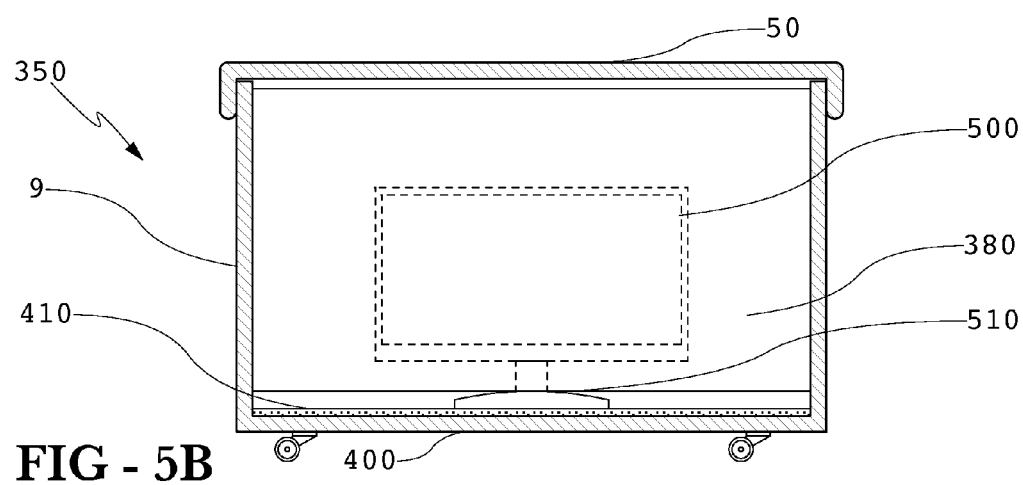
FIG. 5B provides another sectional view for the embodiment 350 of the device, produced by the cutting line 5-5 in FIG. 4.

FIG. 5B provides another sectional view for the embodiment 350 of the device, produced by the cutting line 5-5 in FIG. 4. Here, a substantially planar article 500 with a pedestal base portion 510 is shown inserted into the device. Here, the securing sheet 380 is vertically inserted into the locating features only until the bottom edge of the securing sheet 380 contacts the pedestal 510. Thus, the securing sheet 380 is only partially inserted. Once inserted, the pedestal 510 is at least partially sandwiched between the bottom portion 400 of the container 9 and the bottom edge of the securing sheet 380. Here, there is also an optional slip-resistant surface 410, so that the pedestal 510 actually has at least a portion sandwiched between the slip-resistant surface 410 and the bottom edge of the securing sheet 380.

With a first securing sheet in place, a second securing sheet (not shown) can be inserted on the opposite side of the substantially planar article 500. Because the securing sheets can rest atop the pedestal 510 (which can have any number of dimensional attributes), the middle portions of the securing sheets can rest immediately adjacent to the substantially planar article 500, keeping it securely in place during transport. This exemplary embodiment allows a quick and secure loading of these pedestal-type articles, even alongside other traditional types of articles.

Figure 5C:
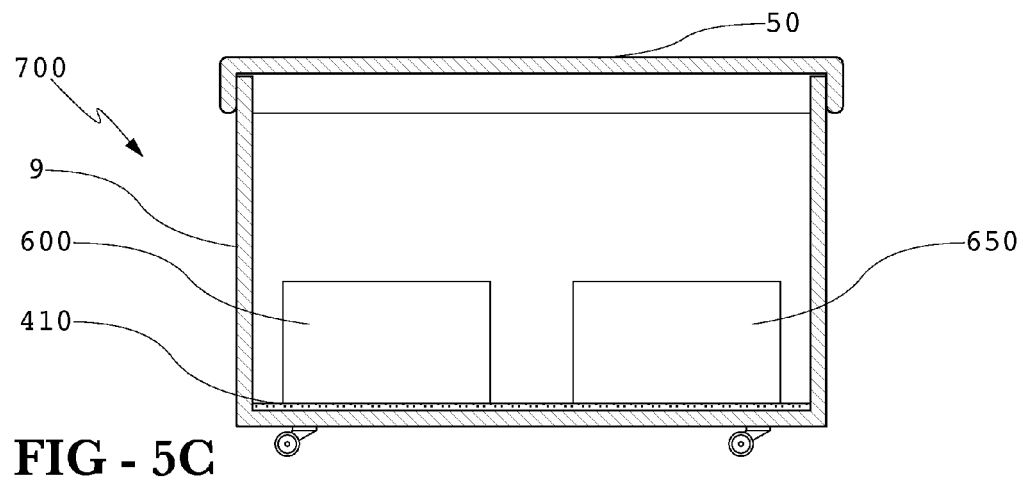
FIG. 5C provides a sectional view for another embodiment 700, produced by the cutting line 5-5 in FIG. 4.

FIG. 5C provides a sectional view for another embodiment 700, produced by the cutting line 5-5 in FIG. 4. This view illustrates another beneficial use of the exemplary embodiments of the invention. Here, two articles 600 and 650 can be placed between a single pair of securing sheets (or between a securing sheet and the sidewall portion of the container). When used with an adequate slip-resistant surface 410, the articles 600 and 650 can be safely transported without heavily impacting one another or shifting in large amounts during transport. Although some applications may require some type of padding or material to be placed between the two articles, this is not necessary in exemplary embodiments. This allows a single device to be used, even if the overall dimensions of the container are sized for larger articles, small articles can still be effectively inserted and transported.

The side walls and base portions of the containers are preferably rigid but may be comprised of any rigid or semi-rigid material. As discussed above, the securing sheets are preferably flexible but may be rigid or semi-rigid as well. A number of different materials can be used to form the sidewall portions of the container, bottom portion of the container, lid, and the securing sheets. Exemplary materials would include, but are not limited to: wood, plastic, composites, fiberglass, cellulose or cellulose composite materials, aluminum, pressboard, steel, fiber-reinforced materials, or cardboard. An exemplary material for flexible securing sheets has been found to be thin wood sheeting, plastic, or fiberglass.

As can be readily appreciated, a plurality of various-sized and shaped articles can be quickly inserted into and securely held within an exemplary container. Any number of securing sheets may be used with the locating features so that a customized compartment can be created for each article. Creating the customized compartments and inserting the articles takes only a fraction of the time that was previously used to wrap each article separately. Further, due to the container's rigidity, the articles are well-protected against damage, with better resistance to compressive forces (and exposure to the elements) than when individually wrapped. Thus, other items (even heavy/bulky ones) can be stacked atop the articles (once inserted into the container) to conserve space within a moving vehicle.

The embodiments herein can be sized appropriately for the articles to be moved. Thus, a large embodiment could be used to move larger paintings/pictures/mirrors and flat screen displays. A medium-sized embodiment could be used to move smaller paintings/pictures/mirrors and flat screen displays. A small version could be used to move plates/dishware and small picture frames etc.

While certain embodiments of the present invention are described in detail above, the scope of the invention is not to be considered limited by such disclosure, and modifications are possible without departing from the spirit of the invention as evidenced by the following claims:

The invention claimed is:
1. A device for transporting articles, the device comprising:
   a container having a bottom portion and two pairs of opposing side portions, the container having interior and exterior surfaces;
   a plurality of vertical slots on the interior surface of at least one pair of opposing side portions;
   a pair of flexible securing sheets, each sheet having first and second vertical edges and a middle portion, where the first vertical edge is adapted to fit within a vertical slot on one side portion and the second vertical edge is adapted to fit within a vertical slot on the opposing side portion, and where the first and second vertical edges are fixed horizontally within the vertical slots while the middle portion of the securing sheet is capable of horizontal movement.

2. The device of claim 1 further comprising:
a rubber surface on the interior surface of the bottom portion of the container.

3. The device of claim 1 further comprising:
a means for rolling the container attached to the exterior surface of the bottom portion of the container.

4. The device of claim 1 further comprising:
a lid atop the side portions of the container.

5. The device of claim 4 further comprising:
a gap between the securing sheets and the lid.

6. The device of claim 5 wherein:
the gap is between 1.5 and 4 inches.

7. The device of claim 4 further comprising:
a bumper around the perimeter of the lid.

8. The device of claim 1 further comprising:
locking casters on the exterior surface of the bottom portion.

9. A device for transporting articles, the device comprising:
a container with a bottom portion, a first and second pair of opposing sidewall portions extending vertically from the bottom portion at a sidewall height, each portion of the container having an interior and exterior surface;
a plurality of vertical slots on the interior surface of the first pair of opposing sidewall portions;
a pair of securing sheets, each sheet connecting a vertical slot on one of the sidewall portions with a vertical slot on the opposing sidewall portion;
a lid atop the first and second pair of opposing sidewall portions; and
wheels attached to the exterior surface of the bottom portion.

10. The device of claim 9 wherein:
the securing sheets having a vertical height which is less than the sidewall height.

11. The device of claim 10 further comprising:
a bumper around the perimeter of the lid.

12. The device of claim 9 wherein:
the vertical slots are spaced between 0.25 and 2.5 inches apart.

13. The device of claim 9 further comprising:
a cloth surface substantially covering the securing sheets.

14. The device of claim 9 further comprising:
a padded layer atop the interior surface of the bottom portion.

15. A device for transporting a substantially planar article attached to a pedestal, the device comprising:
a container having a bottom portion for supporting the pedestal, and a first and second pair of opposing sidewall portions extending vertically from the bottom portion;
a plurality of vertical slots on the first pair of opposing sidewall portions;
a first securing sheet having a bottom horizontal edge and being vertically inserted into a pair of vertical slots so that the first securing sheet is adjacent to the planar article while the pedestal is at least partially between the bottom horizontal edge of the securing sheet and the bottom portion of the container; and
a second securing sheet having a bottom horizontal edge and being vertically inserted into a pair of vertical slots so that the second securing sheet is adjacent to the opposite side of the planar article as the first securing sheet, while the pedestal is at least partially between the bottom horizontal edge of the second securing sheet and the bottom portion of the container.

16. The device of claim 15 further comprising:
a carpeted surface on the interior surface of the bottom portion of the container.

17. The device of claim 15 further comprising:
a means for rolling the container attached to the exterior surface of the bottom portion of the container.

18. The device of claim 15 further comprising:
a lid atop the sidewall portions of the container.

19. The device of claim 18 further comprising:
a bumper around the perimeter of the lid.

* * * * *